Nov. 20, 1934.    J. L. ANDERSON    1,981,340
CIRCUMFERENTIAL PIPE CUTTING OR WELDING MACHINE
Filed Aug. 13, 1932    4 Sheets-Sheet 1
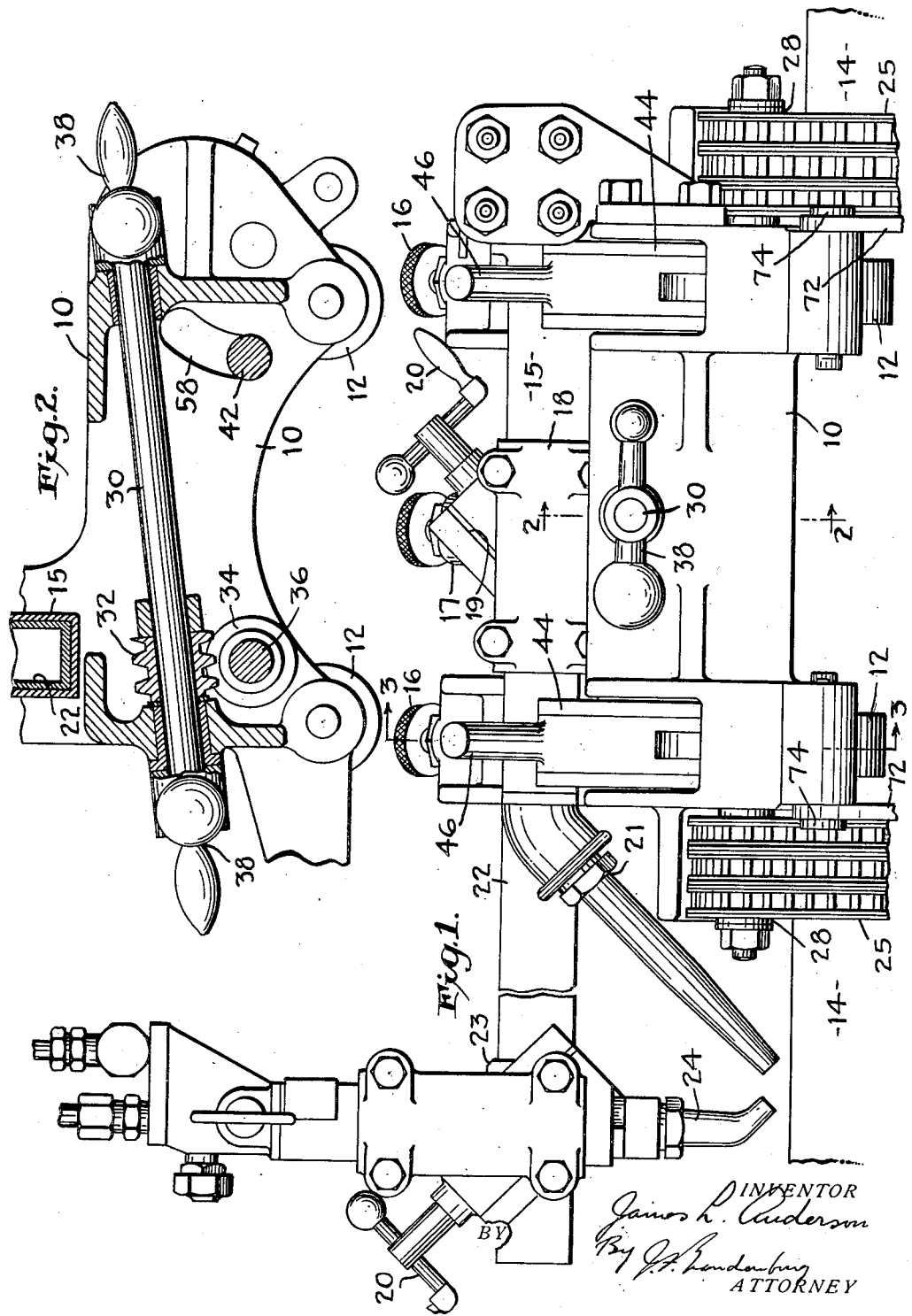

Nov. 20, 1934.　　　　　J. L. ANDERSON　　　　　1,981,340

CIRCUMFERENTIAL PIPE CUTTING OR WELDING MACHINE

Filed Aug. 13, 1932　　　4 Sheets-Sheet 2

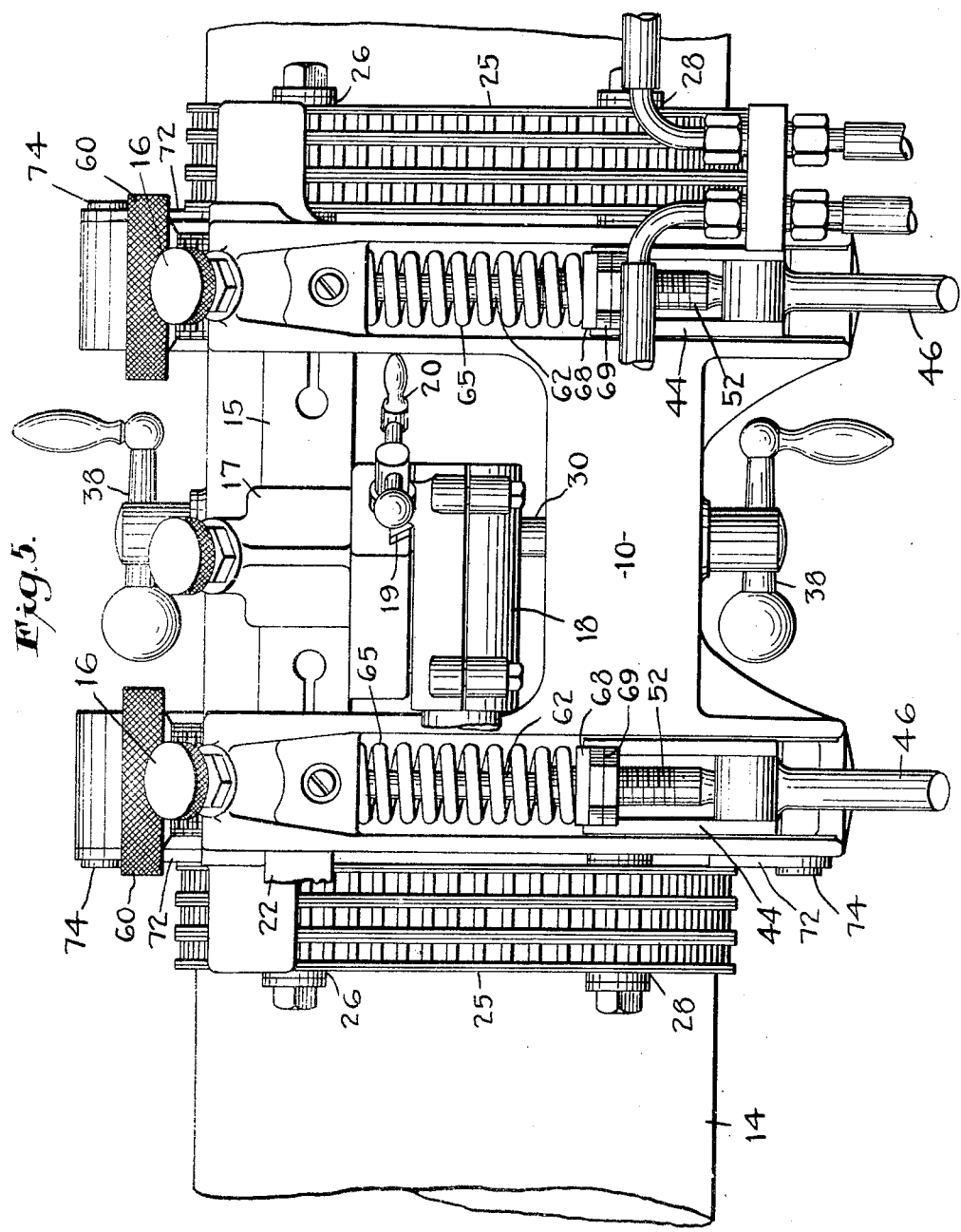

Patented Nov. 20, 1934

1,981,340

UNITED STATES PATENT OFFICE 1,981,340

CIRCUMFERENTIAL PIPE CUTTING OR WELDING MACHINE

James L. Anderson, Closter, N. J., assignor to Air Reduction Company, Incorporated, New York, N. Y., a corporation of New York Application August 13, 1932, Serial No. 628,664

15 Claims. (Cl. 266—23)

This invention relates to circumferential pipe cutting or welding machines which carry a torch around the circumference of a pipe, or rotate the pipe relatively to the machine. The invention relates particularly to that type of machine or appliance which comprises a torch carriage having wheels or rollers contacting with the surface of the pipe, and a flexible member passing around the pipe and over the carriage to hold the carriage against the pipe while it travels around the circumference of the pipe, or while the pipe is turned about its axis, this member cooperating with drive mechanism on the carriage.

Devices of this type have distinct advantages over other circumferential cutting or welding machines, and the object of this invention is greatly to improve the plan so that it is easier to obtain smooth and true cuts, and so that other advantages are realized. If the carriage does not travel at substantially uniform speed, the cut is likely to be rough. If the speed becomes too great during a part of the travel, the torch may leave a part of the pipe uncut. If there is lost-motion in the connection holding the carriage against the pipe, the torch may make a quick move as the lost-motion is taken up, and a rough or uncut portion result. Another obstacle to uniform torch speed has been the uneven pressure of the carriage against the pipe. This uneven pressure causes the carriage to move freely during part of its travel and with greatly increased friction during other parts. I have discovered that this uneven pressure is the result of having the flexible member pass over the carriage at considerable distance above the surface of the pipe. The distance from the pipe surface to the point of contact of the flexible member with the top of the carriage is an effective lever arm through which forces tending to lift the rear rollers and load the front rollers, or vice-versa, are magnified to such an extent that the effort required to keep the carriage moving is materially increased and binds the carriage. The flexible member is subjected to severe stretching strain, and if the wheel or bearing over which the flexible member passes to hold the carriage against the pipe is sufficiently far from the pipe surface, the force stretching the flexible member approaches that of a toggle. It is an object of this invention to provide a pipe cutting machine with a torch carriage having rollers and held against the pipe by a flexible member which passes over a wheel close to the surface of the pipe.

In machines held to the pipe by flexible members passing over wheels on the carriage, the driving mechanism for moving the carriage on the pipe can be connected to these wheels. Lost motion in the driving mechanism permits a limited turning of the wheels, and movement of the carriage on the pipe, independent of the operation of the driving mechanism. This limited movement may cause the carriage to travel alternately slower and faster than the speed determined by the driving mechanism. An operator must exercise care to prevent such irregularities in the speed and consequent rough or uncompleted cuts. I have discovered that this movement of the carriage, which occurs independently of the driving mechanism, can be reduced so that it is no longer troublesome by equipping the carriage with two spaced apart wheels for each of the flexible members. It is an object of this invention to provide a pipe cutting or welding machine having a carriage held against the pipe by one or more flexible members passing around the pipe and over the carriage, and to provide two spaced apart wheels on the carriage for supporting each of the flexible members as it passes over the carriage.

When making a cut around the circumference of a pipe it is desirable to have the plane of the cut at right angles to the axis of the pipe, and it is essential that the torch return to its starting point. If the carriage slips sideways or twists, while passing around the pipe, the torch will make a spiral cut and the pipe will not be severed. It is important to have the flexible member pass around the pipe in a plane at right angles to the pipe axis in order to insure a straight cut.

It is an object of this invention to provide means for holding the flexible member in a plane normal to the pipe axis. A more specific object of the invention is to provide wide face sprocket chains for holding the torch carriage against the pipe, and to provide rigid guide members for holding the chains in proper position, the guide members comprising arms pivotally connected with the torch carriage for oscillation in a plane normal to the pipe axis. The wide faces of the chains give them a large gripping area on the pipe and tend to keep the chains in the plane normal to the pipe axis.

Another object of the invention is to prevent the torch carriage from twisting out of its proper line of travel and making a spiral cut. The invention prevents such twisting by providing flexible members for holding the carriage against the pipe, and widely spacing these flexible members, as by locating them on opposite sides of the carriage and out beyond the carriage rollers, so that the flexible members have a mechanical advantage in resisting twisting of the carriage out of a straight path.

Another object of the invention is to provide improved mechanism for driving the torch carriage around the circumference of the pipe. It will be understood that the movement of the carriage around the pipe is relative and that reference to such movement also contemplates operation of the machine by holding the carriage and causing the pipe to rotate. The improved driving mechanism includes a driving wheel on the carriage for moving the flexible member with respect to the carriage, and thus propelling the carriage around the pipe, and also includes an idler wheel for holding the flexible member taut. With this construction the axis of the driving wheel can be fixed with respect to the carriage, and the driving mechanism can, therefore, be simplified. The idler wheel provides a slack adjustment and is resiliently mounted so that it maintains the tension of the flexible member substantially uniform in spite of irregularities in the surface over which the carriage rollers travel.

Another object of the invention is to provide a circumferential pipe cutting machine with supports for two torches which can be adjusted to cut out a section of pipe by simultaneous cuts, both of the torches being set to cut a bevel edge and being adjustable toward and from the pipe surface without changing the location of the cut.

Other objects and advantages of the invention will appear or be pointed out as the description proceeds. The invention is described in connection with pipe cutting, for which it is primarily intended, but it will be understood that it may be used for welding by substituting a welding torch in place of a cutting torch.

In the accompanying drawings, forming a part hereof:

Fig. 1 is a fragmentary side elevation of a circumferential pipe cutting machine embodying the invention;

Fig. 2 is a fragmentary sectional view on the line 2—2 of Fig. 1;

Fig. 5 is a top plan view of the machine shown in Fig. 1, with the torches broken away.

Figure 3:
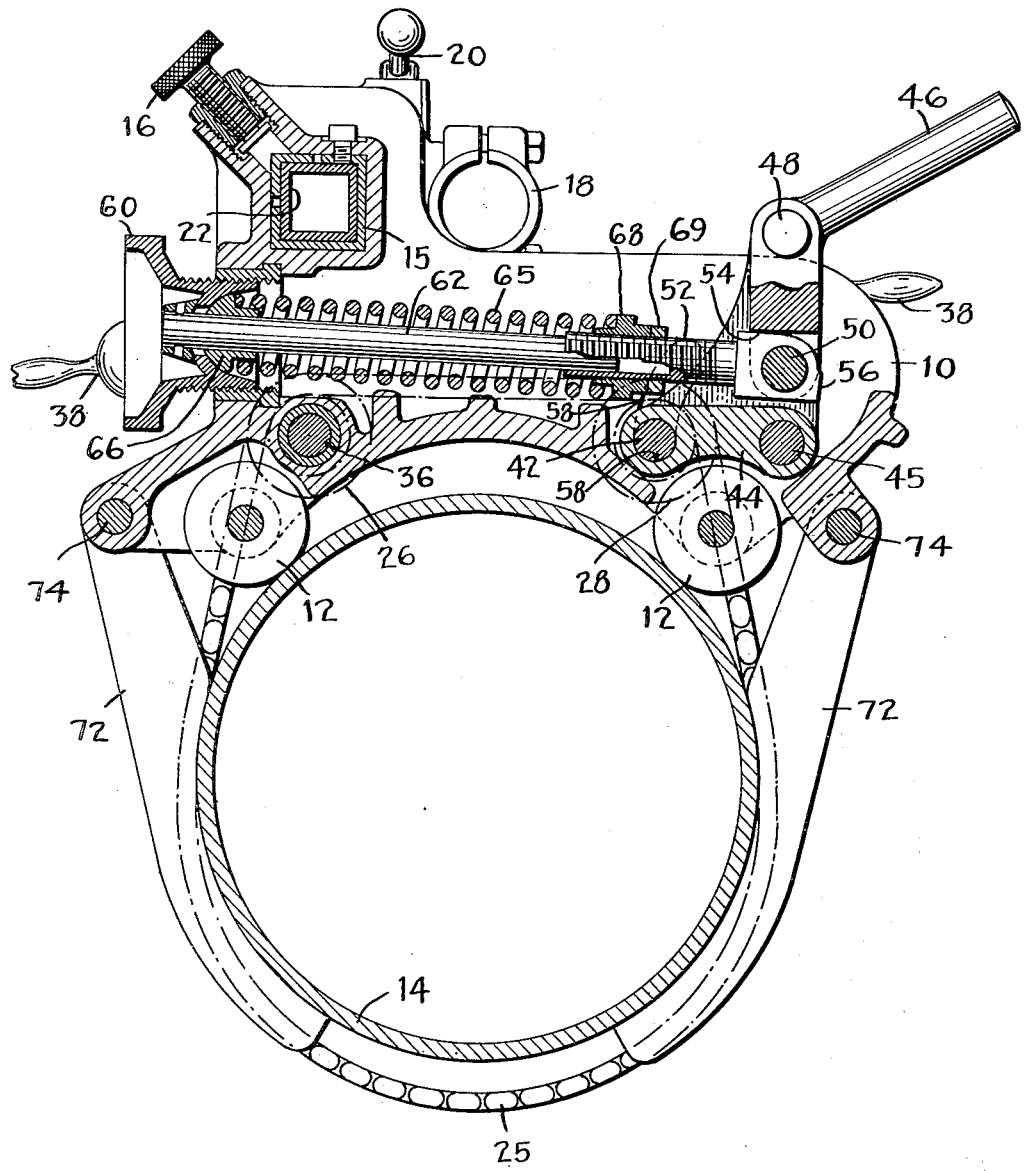
Fig. 3 is a sectional view, on a reduced scale, on the line 3—3 of Fig. 1, also showing the full diameter of the pipe, and the chain and guide members. The torches are removed in Fig. 3, and the chain tensioning means is released so that the chain is loose.

The machine includes a torch carriage having a frame 10 supported on four rollers 12, which contact with the outside of a pipe 14. Different numbers of rollers can be used to support the carriage, but it is important that the carriage be stably supported on the pipe.

A hollow bar 15 is secured to the carriage by clamping screws 16. A clamp 17 is adjustable lengthwise along the hollow bar 15 and has a clamping screw for holding it in any adjusted position. A torch holder 18 is carried by the clamp 17, and a sliding bearing 19 (Fig. 5) permits movement of the torch holder with respect to the clamp. The movement is produced by a handle 20 which operates a lead-screw, not shown, but well understood by those skilled in the art.

A torch 21 is carried by the torch holder 18. Adjustment of the clamp 17 along the bar 15 moves the torch 21 toward or from the carriage. It is desirable to operate the apparatus with the torch 21 close to the carriage so that irregularities encountered by the carriage rollers will not be magnified by the lever arm distance from the torch tip to the carriage rollers.

A bar 22 fits within the hollow bar 15 at one end. The clamping screws 16 compress the hollow bar 15 into engagement with the bar 22 to hold it in position. A clamp 23 is carried by the bar 22 and is adjustable lengthwise along the bar. A torch 24 is connected with the clamp 23 by a slidable bearing similar to the bearing 19 of the clamp 17, and operated by a similar handle 20.

Since it is ordinarily desirable to cut a bevel edge, the tips of the torches 21 and 24 are set to cut at a 45° angle. The lead-screws operated by the handles 20 move the torches toward or from the pipe surface at an angle of 45° to the surface, so that changing the spacing between a torch tip and the pipe will not change the point at which the cutting jet strikes the pipe surface.

When making a single cut, the torch 21 is used, and the bar 22 and torch 24 are unnecessary and can be removed from the carriage. When cutting out a section of pipe, both torches 21 and 24 are used, so that the cuts at both ends of the section can be made simultaneously.

Fig. 3 shows a flexible member passing around the pipe for holding the carriage against the pipe. I prefer to use a sprocket chain 25 for the flexible member, and this chain passes over a driving sprocket wheel 26 and an idler sprocket wheel 28 on the carriage. Similar chain and sprocket mechanism is provided at both sides of the carriage.

The mechanism for operating the driving sprocket wheels is shown in Fig. 2. A shaft 30 is journaled in the frame 10. A worm gear 32 is secured to the shaft 30 and operates a worm wheel 34, which turns a shaft 36. This shaft 36 extends across the frame. The driving sprockets are secured to opposite ends of the shaft 36. Thus the chains are widely spaced and are more effective in holding the carriage against twisting as it travels around the pipe. Handles 38 are connected with both ends of the shaft 30, so that an operator can drive the carriage from either end by using one of these handles to rotate the shaft 30. I prefer to use triple sprockets and chains (Figs. 1 and 5), because the wide face chains tend to assume a position in a plane normal to the pipe axis as the chains are drawn into contact with the surface of the pipe.

Figure 4:
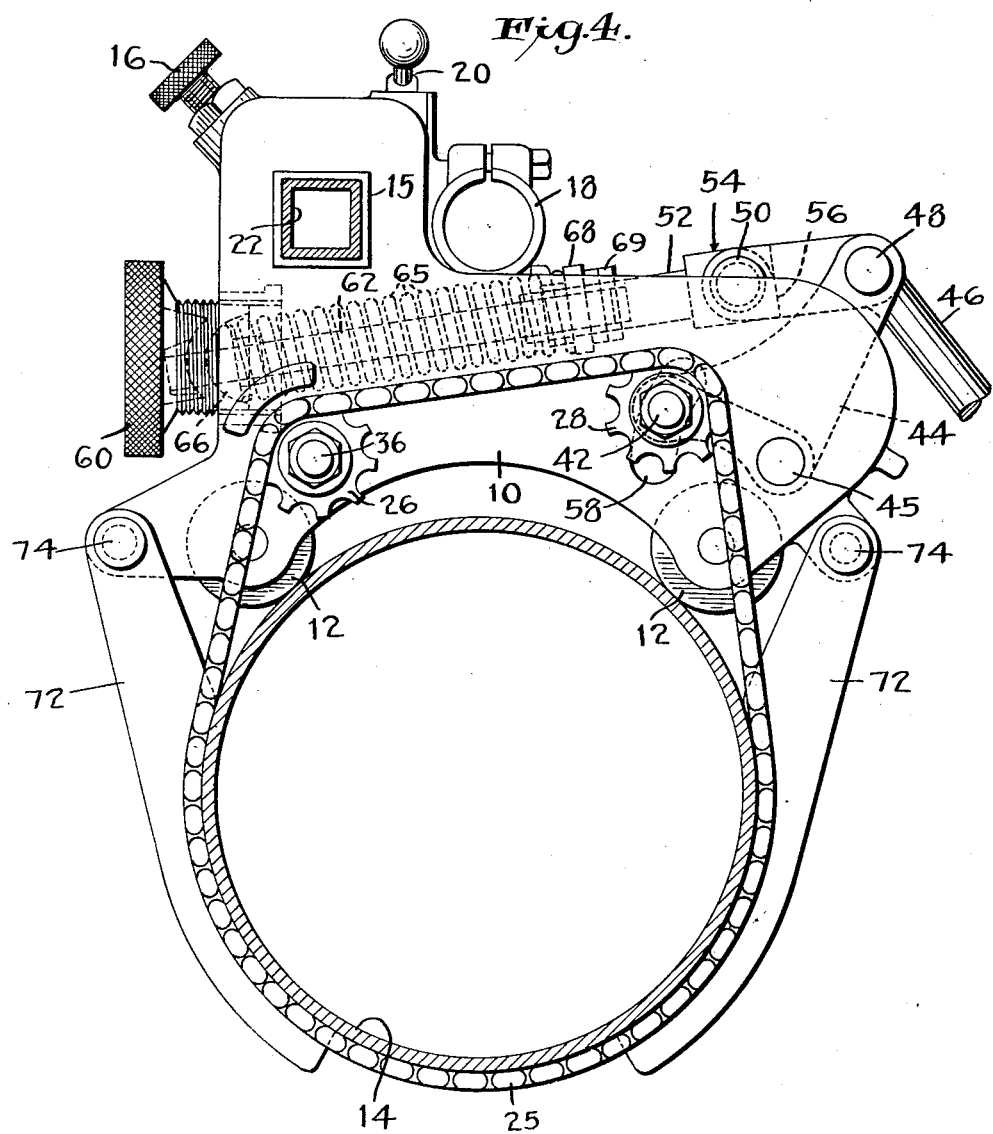
Fig. 4 is an end view, partly in section, showing the chain tensioning means of Fig. 3 when in position to hold the chain taut.

The mechanism for tensioning one of the chains is shown in Figs. 4 and 5. Similar mechanism is provided at both sides of the carriage. The idler sprocket wheel 28 has an axle 42 supported by a bell-crank 44, which is pivotally connected to the carriage frame at 45. A chain release handle 46 is pivotally connected with the bell-crank by a pin 48. The lower end of the handle 46, beyond the pin 48, is pivotally connected, by a pin 50, with the end of a threaded sleeve member 52. The end of this sleeve member has a face 54 which engages the handle 46, as shown in Fig. 3, to limit the movement of the handle when in released position, and has a face 56 for engaging the handle 46, as shown in Fig. 4, to limit the movement of the handle when in position to tension the chain. The axle 42 extends through a slot 58 in the carriage frame, and the ends of this slot limit the extreme movement of the idler sprocket and tensioning means.

Referring again to Fig. 3, a tension adjusting screw 60 is threaded into the carriage frame, and a rod 62 has a ball and socket connection with the adjusting screw 60. The other end of the rod 62 extends into the sleeve member 52, in which it slides freely for telescopic movement.

A spring 65 surrounds the rod 62. One end of the spring contacts with an abutment 66, which has a ball and socket bearing with the tension adjusting screw 60. The other end of the spring 65 contacts with an abutment 68 which is threaded on the sleeve member 52 and held against rotation by a lock nut 69.

With the parts in the positions shown in Fig. 3, the spring 65 is expanded and the tension on the chain 25 released. The chain hangs loosely from the carriage and the idler sprocket is in its lowest position with its axle against the lower end of the slot 58. The chain can be opened by disconnecting two links, in a well understood manner, when changing the machine from one pipe to another.

If a larger pipe is to be cut, the length of the chain can be increased by inserting another section. When convenient, a pipe end can be placed in the chain axially, and it is not necessary to break the chain, but one of the important advantages in using sprocket chains as the flexible members is the facility with which such chains may be opened to fit around a pipe or have sections added or removed to accommodate the machine to larger or smaller diameter pipe.

The chain is tensioned to hold the carriage against the pipe by moving the handle 46 clockwise so that the parts are shifted into the positions shown in Fig. 4. The telescoping of the rod 62 and sleeve 52 causes the spring 65 to be compressed, and the force of the spring tends to rotate the bell-crank 44 in a clockwise direction around the pivot 45. The idler sprocket wheel is urged away from the pipe and holds the chain resiliently but firmly against the pipe and the carriage rollers in contact with the pipe.

The sprockets are close to the pipe surface, so that they have very little leverage for stretching the chain if either the front or rear rollers tend to leave the pipe surface while the carriage is being driven around the pipe. In the illustrated embodiment of the invention the distance between the sprockets and the surface of of the pipe is less than the diameter of the rollers 12.

Chain guides 72 are pivotally connected with the frame by pins 74, and can oscillate in a plane normal to the axis of the pipe. These chain guides extend around a portion of the pipe adjacent the chains, and when the machine is placed on a sloping pipe the chain guides on the higher side of the carriage prevent the chain at the side of the carriage from hanging vertically, and hold the chain in a plane normal to the sloping pipe axis. The chain on the lower side of the carriage, when applied to a sloping pipe, is not held by the guides 72 because in hanging in a vertical position the lower chain is away from the guides 72. Double guides extending along both sides of the chains may be provided, but I find it unnecessary to use guides for holding the lower chain. When the machine is placed on a sloping pipe the chain on the higher side tends to hang under the carriage, and it is difficult for the operator to see whether it is in proper position normal to the pipe axis. The chain at the lower side of the carriage, however, will hang away from the carriage and in clear view of the operator if not in proper position. I, therefore, prefer to use the simple chain guides shown in the drawings, and to rely on the operator to hold the lower chain in position when applying the machine to a sloping pipe.

The device has been described with reference more especially to the cutting of pipe by means of one or more gas cutting torches, but the invention is equally applicable to the welding of circumferential seams, for which purpose it is necessary only to substitute a suitable welding torch. For welding, it is usually more desirable to drive the torch carriage a distance over the upper curvature, and then, without ceasing to drive, to turn the pipe and the appliance as a unit far enough to enable the carriage to continue to travel in an upper arc, this procedure being continued and repeated until the entire circumferential seam is welded.

The preferred embodiment of this invention has been illustrated and described, but changes and modifications may be made without departing from the spirit of the invention as set forth in the appended claims.

I claim:

1. A circumferential pipe cutting or welding machine, comprising a torch carriage; rollers on the carriage for supporting it stably on the surface of a pipe; flexible members for surrounding the pipe to hold the carriage rollers against the pipe; and wheels on the carriage for contacting with the under sides of the flexible members, the wheels being located at opposite sides of the carriage and outside of the rollers so that the wide spacing of the flexible members will prevent twisting of the carriage as it moves around the periphery of the pipe.

2. A circumferential pipe cutting or welding machine, comprising a torch carriage; rollers supporting the carriage for movement over the surface of the pipe; sprockets on the carriage at opposite sides of the carriage beyond the rollers so that the sprockets are more widely spaced than the rollers; a chain passing around the pipe and over the sprocket at one side of the carriage; another chain passing around the pipe and over the sprocket at the other side of the carriage; and mechanism for driving the sprockets to cause relative movement between the carriage and the pipe.

3. Cutting or welding apparatus comprising a torch carriage for traveling around the circumference of a pipe; rollers on the carriage for supporting it on the surface of the pipe; a multiple sprocket chain passing around the pipe for holding the carriage rollers against the pipe; a multiple sprocket at one side of the carriage for engaging under the chain; and another multiple sprocket and chain at the other side of the carriage.

4. A pipe cutting or welding machine including a torch carriage; rollers on the carriage for supporting it stably on the surface of a pipe; a flexible member for passing around the pipe and over the carriage to hold the carriage rollers against the pipe; a driving wheel on the carriage contacting with the under side of the flexible member; and another wheel on the carriage contacting with the under side of the flexible member, and rotatable about an axis spaced from but parallel to the axis of said driving wheel.

5. A pipe cutting or welding machine including a torch carriage; rollers on the carriage for supporting it stably on the surface of a pipe; a flexible member for passing around the pipe and over the carriage to hold the carriage rollers against the pipe; a driving wheel on the carriage contacting with the under side of the flexible member; and an idler wheel on the carriage contacting with the under side of the flexible member.

6. A pipe cutting or welding machine including a torch carriage; rollers on the carriage for supporting it stably on the surface of a pipe; a flexible member for passing around the pipe and over the carriage to hold the carriage rollers against the pipe; a driving wheel on the carriage contacting with the under side of the flexible member; an idler wheel on the carriage contacting with the under side of the flexible member; and means for adjusting the position of the idler wheel to regulate the tension of the flexible member.

7. A circumferential pipe cutting or welding machine including a torch carriage; rollers on the carriage for supporting it stably on the surface of a pipe; a driving wheel and an idler wheel on the carriage; a flexible member for passing around the pipe and over the driving and idler wheels to hold the carriage rollers against the pipe; and resilient supporting means urging the idler in a direction to maintain the flexible member under tension.

8. A circumferential pipe cutting or welding machine including a torch carriage; rollers on the carriage for supporting it stably on the surface of a pipe; a driving sprocket and an idler sprocket on the carriage; a sprocket chain for passing over both of said sprockets and around the pipe to hold the carriage rollers against the pipe; and movable supporting means for the idler sprocket including a spring for maintaining the chain under a substantially uniform tension as the carriage travels over a rough pipe surface.

9. A circumferential pipe cutting or welding machine including a torch carriage; rollers on the carriage for supporting it stably on the surface of a pipe; a flexible member for passing around the pipe and over the carriage to hold the carriage rollers against the surface of the pipe; and two wheels close to the pipe but spaced therefrom, and supported by the carriage on substantially parallel axles, said wheels providing the contact between the flexible member and the carriage.

10. A pipe cutting or welding apparatus including a torch carriage; rollers supporting the carriage stably for movement on and around the circumference of a pipe; a flexible member for passing around the pipe; and a wheel supported by the carriage, the flexible member passing over the upper side of the wheel to hold the carriage against the pipe, and the wheel being located close to the pipe with the distance between the pipe and wheel less than the diameter of the carriage supporting rollers so as to limit the length of the effective lever arm acting to stretch the flexible member and cause uneven pressure on the respective rollers of the carriage when said carriage moves around the surface of a pipe.

11. A circumferential pipe cutting or welding machine comprising a torch carriage; rollers on the carriage for supporting it stably on the surface of a pipe; flexible members for surrounding the pipe to hold the carriage rollers against the pipe; and wheels on the carriage for contacting with the under sides of the flexible members, the wheels being located at opposite sides of the carriage and outside of the rollers so that the wide spacing of the flexible members will prevent twisting of the carriage as it moves around the periphery of the pipe, the wheels being also located close to the surface of the pipe to prevent binding of the carriage as it moves around the pipe.

12. A circumferential pipe cutting or welding machine including a torch carriage; rollers on the carriage for supporting it stably on the surface of a pipe; a sprocket on the carriage adjacent the front end of the carriage; another sprocket on the carriage adjacent the other end of the carriage, both of the sprockets being located adjacent the surface of the pipe; and a sprocket chain for passing around the pipe and over both sprockets to hold the carriage rollers against the pipe.

13. A circumferential pipe cutting or welding machine including a torch carriage; rollers on the carriage for supporting it stably on the surface of a pipe; a flexible member for passing over the carriage and around the pipe to hold the carriage rollers against the pipe; and guide means to hold the flexible member in line with the travel of the carriage and thus prevent a spiral cut, the guide means including a member pivotally connected with the carriage for oscillation in a plane at right angles to the axis of the pipe.

14. A circumferential pipe cutting or welding machine including a torch carriage; rollers on the carriage for supporting it stably on the surface of a pipe; a flexible member for passing over the carriage and around the pipe to hold the carriage rollers against the pipe; a rigid arm connected with the carriage and curved to fit around a portion of the pipe to serve as a guide for holding the flexible member in a plane at right angles to the axis of the pipe when the pipe is in a sloping position.

15. A circumferential pipe cutting or welding machine including a torch carriage; rollers on the carriage for supporting it stably on the surface of a pipe; a flexible member for passing over the carriage and around the pipe to hold the carriage rollers against the pipe; a rigid arm pivotally connected with the carriage adjacent its forward end for oscillation in a plane normal to the pipe axis, the arm being curved to fit around a portion of the pipe; another rigid arm similarly connected with the carriage adjacent its rearward end and curved to fit around a portion of the pipe, both arms being connected with the carriage adjacent the flexible member and serving as guides to hold the flexible member in a plane normal to the pipe axis when the pipe is inclined.

JAMES L. ANDERSON.